(12) United States Patent
Chen et al.

(10) Patent No.: US 7,031,291 B2
(45) Date of Patent: Apr. 18, 2006

(54) METHOD AND APPARATUS FOR ENHANCING AIR-INTERFACE INFORMATION EXCHANGE DURING A DORMANT PACKET DATA SESSION

(75) Inventors: An Mei Chen, San Diego, CA (US); Ling Hang, San Diego, CA (US); Sajith Balraj, San Diego, CA (US); Ben Saidi, San Diego, CA (US)

(73) Assignee: QUALCOMM, Inc., San Diego, CA (US)

( * ) Notice: Subject to any disclaimer, the term of this patent is extended or adjusted under 35 U.S.C. 154(b) by 186 days.

(21) Appl. No.: 10/428,400

(22) Filed: May 2, 2003

(65) Prior Publication Data

US 2004/0218555 A1 Nov. 4, 2004

(51) Int. Cl.
*H04B 7/216* (2006.01)
(52) U.S. Cl. ...................... 370/342; 370/338
(58) Field of Classification Search ............... 370/311, 370/312, 313, 328, 338, 432, 433, 437, 310, 370/315, 320, 329, 331, 335, 342, 351, 352, 370/353, 400; 455/435.2, 433, 458, 507, 455/515, 517, 518, 519, 435.1
See application file for complete search history.

(56) References Cited

U.S. PATENT DOCUMENTS

2002/0055364 A1    5/2002   Wang et al. ............... 355/466
2002/0145990 A1*  10/2002   Sayeedi ..................... 370/335
2003/0185161 A1*  10/2003   Harris et al. .............. 370/310
2003/0210692 A1*  11/2003   Ramanna et al. .......... 370/389
2004/0062227 A1*   4/2004   Sayeedi ..................... 370/350
2004/0184436 A1*   9/2004   Abrol et al. ............... 370/349

FOREIGN PATENT DOCUMENTS

WO        WO0113669        11/2000

OTHER PUBLICATIONS

Serge Manning, Alberto Gutierrez, and Michael Wang, "A short data burst mechanism for third generation cdma wireless packe data", 1999, IEEE.*

* cited by examiner

*Primary Examiner*—Phirin Sam
(74) *Attorney, Agent, or Firm*—Philip R. Wadsworth; Robert J. O'Connell

(57) ABSTRACT

Methods and apparatus for exchanging information with a dormant target communication device provide for locating a dormant target communication device by a wireless infrastructure, forwarding information to the dormant target communication device by the wireless infrastructure, and allowing the dormant target communication device, upon receiving said information from the wireless structure, to start forwarding information to the wireless structure. The methods and apparatus further provides for piggybacking information sent to and/or received from the dormant target communication device.

45 Claims, 10 Drawing Sheets

METHOD AND APPARATUS FOR ENHANCING AIR-INTERFACE INFORMATION EXCHANGE DURING A DORMANT PACKET DATA SESSION

FIELD

The present invention relates to exchanging information in wireless communications systems. More specifically, the present invention relates to methods and apparatus for enhancing air-interface information exchange with a dormant target communication device in a wireless communication network.

BACKGROUND

When the packet data service in a wireless communications system is active, resources in the infrastructure, e.g., base station transceiver subsystem (BTS), base station controller (BSC), packet control function (PCF), and the radio link are actively assigned to the participating communication devices. After a period of inactivity in a communication device, the corresponding traffic channel may transition to a dormant packet data session to conserve system capacity, reduce service cost, and save battery life. However, the act of transitioning the dormant packet data session back to an active packet data session is accompanied by a considerable delay in the system response.

There is a need, therefore, for mechanisms to efficiently exchange information with a dormant communication device.

SUMMARY

The disclosed embodiments provide novel and improved methods and apparatus for exchanging information with a dormant target communication device in a wireless communication network. In one aspect, a method for exchanging information with the dormant target communication device in a wireless communication system provides for sending a page message to a dormant target communication device to locate the dormant target communication device by a wireless infrastructure, receiving a page response from the dormant target communication device, and forwarding information to the dormant target communication device by the wireless infrastructure, wherein the information is piggybacked onto a message acknowledging the receipt of the page response. The method further includes receiving an acknowledgement message that the dormant target communication has received the information, and forwarding a release order to the dormant target communication device, thereby allowing the dormant target communication device to start forwarding information to the wireless infrastructure, wherein the release order is piggybacked onto a message acknowledging the receipt of the acknowledgement message. In one aspect, the information is communicated as short data bursts.

In one aspect, a method for exchanging information with a dormant target communication device in a wireless communication system provides for sending a page message to a dormant target communication device to locate the dormant target communication device by a wireless infrastructure, receiving a page response from the dormant target communication device, and forwarding information to the dormant target communication device by the wireless infrastructure, thereby allowing the dormant target communication device to start forwarding information to the wireless infrastructure, wherein the information is piggybacked onto a message acknowledging the receipt of the page response. The method further includes receiving information from the dormant target communication device, wherein the information is piggybacked onto a message acknowledging the receipt of the information sent by the wireless structure.

In one aspect, an apparatus for exchanging information with a dormant target communication device in a wireless communication system includes a memory unit, a receiver, a transmitter, and a processor communicatively coupled with the memory unit, the receiver, and the transmitter. The processor is capable of carrying out the above-mentioned methods.

BRIEF DESCRIPTION OF THE DRAWINGS

The features and advantages of the present invention will become more apparent from the detailed description of the embodiments set forth below.

DETAILED DESCRIPTION

Figure 1:
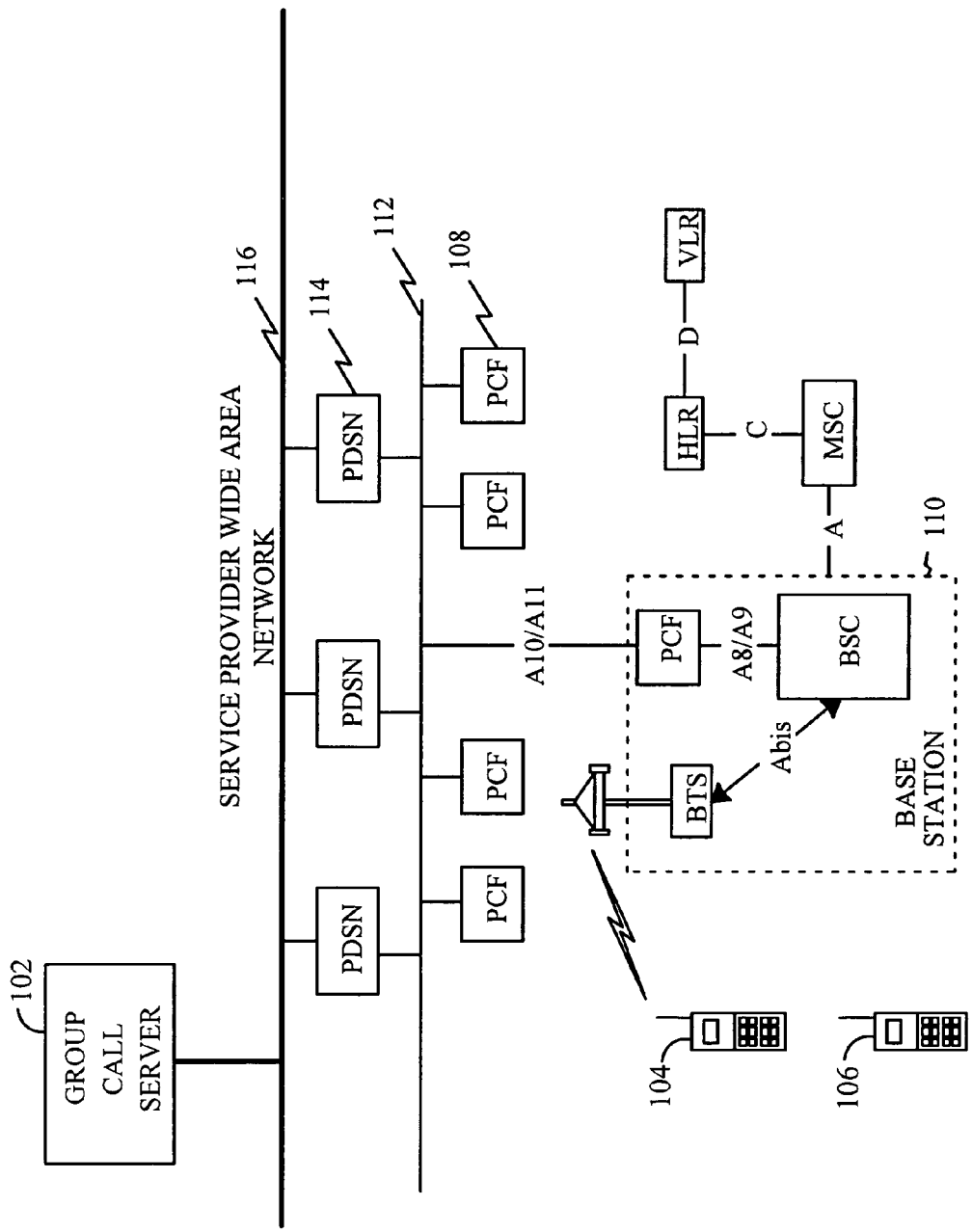
FIG. 1 illustrates a group communications system.

Before several embodiments are explained in detail, it is to be understood that the scope of the invention should not be limited to the details of the construction and the arrangement of the components set forth in the following description or illustrated in the drawings. Also, it is to be understood that the phraseology and terminology used herein is for the purpose of description and should not be regarded as limiting.

FIG. 1 illustrates a functional block diagram of a group communication system 100, for implementing one embodiment. Group communication system 100 is also known as a push-to-talk (PTT) system, a net broadcast service (NBS), a dispatch system, or a point-to-multi-point communication system. In one embodiment, group communication system 100 includes a group call server 102, which may be deployed in either a centralized deployment or a regionalized deployment.

Group communication devices (CDs) 104 and 106, which may be deployed such as cdma2000 handset, for example, may request packet data sessions using a data service option. Each CD may use the session to register its Internet Protocol (IP) address with the group call server to perform group call initiations. In one embodiment, group call server 102 is connected to the service provider's packet data service nodes (PDSNs) through service provider's network 116. CDs 104 and 106, upon requesting packet data sessions from the wireless infrastructure, may have IP connectivity to group call server 102 through the PDSNs 114. Each PDSN may interface to a base station controller (BSC) through a packet control function (PCF) 108 and a network 112. The PCF may be co-located with the BSC within a base station (BS) 110.

A packet data service node may fall in one of several states, e.g., active or connected state, dormant state, and null or inactive state. In the active or connected state, a active traffic channel exists between the participating CD and the BS or BSC, and either side may send data. In the dormant state, no active traffic channel exists between the participating CD and the BSC, but a point-to-point protocol (PPP) link is maintained between the participating CD and the PDSN.

In the null or inactive state, there is no active traffic channel between the participating CD and the BSC, and no PPP link is maintained between the participating CD and the PDSN.

After powering up, CDs 104 and 106 may request packet data sessions. As part of establishing a packet data session, each CD may be assigned an IP address. Each CD may perform a registration process to notify group call server 102 of the CD's IP address. Registration may be performed using an IP protocol, such as session initiation protocol (SIP) over user datagram protocol (UDP). The IP address of a CD may be used to contact the CD when the corresponding user is invited into a group call.

Once a group call is established, CDs 104 and 106 and group call server 102 may exchange media and signaling messages. In one embodiment, media may be exchanged between the participating CDs and the group call server by using real-time protocol (RTP) over UDP. The signaling messages may also be exchanged by using a signaling protocol over UDP.

Group communication system 100 performs several different functions in order to operate group call services. The functions that relate to the user side include user registration, group call initiation, group call termination, sending alerts to group participants, late join to a group call, talker arbitration, adding members to a group, removing members from a group, un-registering a member, and authentication. The functions that relate to system preparation and operation include administration and provisioning, scalability, and reliability.

PTT Latency

In one embodiment, when the packet data service is active, resources in the infrastructure, e.g., base station transceiver subsystem (BTS), base station controller (BSC), packet control function (PCF), and the radio link are actively assigned to the participating CDs. In an IP-based dispatch service, while there is an active conversation going on between group members, the packet data connection for each participating CD remains active. However, after a period of inactivity, i.e., "hang time," the traffic channels assigned to the participating CDs may be released and the participating CDs may transition to the dormant state.

The transition to the dormant state conserves system capacity and reduces service cost and battery drain. When the packet data sessions are active, even if no data packets are being exchanged, radio frequency (RF) energy may still be transmitted by the participating CDs, albeit at a low level, to maintain synchronization and power control with the base station. These transmissions may cause a significant power drain on the participating CDs. In the dormant state, however, the participating CDs may not perform RF transmission. To conserve power and extend battery life, the hang time may be set to transition the participating CDs to dormant mode after extended periods of no data transmission.

In the case of an active group call, while the packet data services for all participating CDs are active, new PTT requests have very low latency. However, if the participating CDs have previously transitioned to the dormant state, PTT latency may be much longer. During packet data dormancy state, information associated with the packet data session, which may include the CDs' IP address, may be maintained. However, state information associated with layers below PPP, such as active traffic layers, may be released and/or de-allocated.

In some infrastructures, to wake up dormant packet data sessions, the traffic channels must be reallocated, the resources must be reassigned, and the radio link protocol (RLP) layer must be reinitialized. The effect of this is that after a group has not talked for a while, when a group member presses the PTT button to request the floor, PTT latency for the first talk spurt is generally much longer than for subsequent talk spurts. While this is relatively infrequent, it may affect the utility of the group call service, and should be minimized.

To reduce PTT latency, the group call signaling, such as the floor-control requests, floor-control announcements, and dormancy wakeup messages, may be transmitted on some available common channels. This eliminates waiting for dedicated traffic channels to be re-established. Common channels may be always available, regardless of the state of the participating CDs, and may not require being requested and reassigned each time a group member initiates a group call. Therefore, the group call signaling messages may be exchanged even when the participating CDs are dormant. In one embodiment dedicated traffic channels for the caller's CD and listeners' CDs may be re-established in parallel.

In one embodiment, a dormant caller's CD may send a floor-control request to the wireless infrastructure over some available reverse common channel, such as reverse access channel and reverse enhanced access channel. The caller's CD may also receive a response to the floor-control request on some available forward common channel, such as forward paging channel and forward common control channel. In one embodiment, dormant listeners' CDs may receive dormancy wakeup messages on some available forward common channel, such as forward paging channel and forward common control channel.

Short Data Burst Call-Signaling Messages

In one embodiment, a significant reduction in dormancy wakeup time may be achieved through the use of short data burst (SDB) messages, as provided in "TIA/EIA/IS-2000 Standards for cdma2000 Spread Spectrum Systems," such as TIA/EIA/IS-707-A-2, "Data Service Option Standard for Spread Spectrum Systems, Addedum 2," June 2000, and TIA/EIA/IS-2001-A, "Interoperability Specification (IOS) for cdma2000 Access Network Interfaces," August 2001, hereinafter referred to as "the cdma2000 standard." In one embodiment, SDB messages may be sent over a dedicated active channel, such as the forward fundamental channel (FCH) or forward dedicated common control channel (F-DCCH). SDB messages may also be sent over a common active channel, such as the reverse access channel (R-ACH), reverse enhanced access channel (R-EACH), forward common control channel (F-CCCH), or paging channel (PCH). SDB messages may be transported by radio burst protocol (RBP), which maps the messages onto an appropriate and available active layer channel. Because SDB messages may carry arbitrary IP traffic and may be sent over common active channels, SDB messages provide a mechanism to exchange group call signaling when participating CDs have no available dedicated traffic channel.

Mobile-Originated Call-Signaling Messages

In one embodiment, media-signaling messages may carry IP datagrams over the reverse link or mobile-originated link. A talker's CD may signal the group call server quickly whenever the talker requests the floor and a dedicated reverse traffic channel is not immediately available. Assuming the talker's CD has released all dedicated traffic channels, the talker's CD may immediately forward the floor control request over a reverse common channel of a wireless infrastructure, which may relay the request to the group call server. For example, either the reverse access channel or the reverse enhanced access channel may be used to send such messages when a dedicated reverse channel is not available. In one embodiment, the talker's CD may transmit a floor-control request to the group call server as SDB messages.

Network-Originated Call-Signaling Messages

In one embodiment, after receiving the floor-control request, the group call server may burst media-signaling messages to a group of dormant target CDs and trigger the dormant target CDs to re-establish their dedicated traffic channels. In one embodiment, the packet control function (PCF) receives a small amount of information, e.g., packet data, from the packet data serving node (PDSN), which may be destined for a dormant target CD. The PCF may determine to send the information to the base station controller (BSC) in a special form. In one embodiment, the special form includes short data burst (SDB) format, as specified in the TIA/EIA/IS-707-A-2, "Data Service Option Standard for Spread Spectrum Systems," Addendum 2, dated June 2000 (IS-707-A-2). The TIA/EIA/IS-2001-A, "Interoperability Specification (IOS) for cdma2000 Access Network Interfaces," dated August 2001 (IS-2001-A) standard defines several options for the BSC to deliver SDB messages to target CDs.

According to the IS-2001-A standard, for example, when a small amount of data destined for a dormant target CD is received at the PCF, the PCF may choose to send the received data to the BSC in SDB format. If the BSC determines that short data bursts may be used to deliver the data to the dormant target CD, the BSC may send the data directly to the dormant target CD over a signaling channel. The BSC may also send the data to the MSC for delivery to the dormant target CD via an application data delivery service (ADDS) Page. The data may be delivered to the MSC using a BSC service request/response procedure. If the BSC is unsuccessful in delivering the SDB data to the dormant target CD on its own, the BSC may choose to send the data to the MSC for delivery to the dormant target CD via the ADDS Page procedure.

Figure 2:
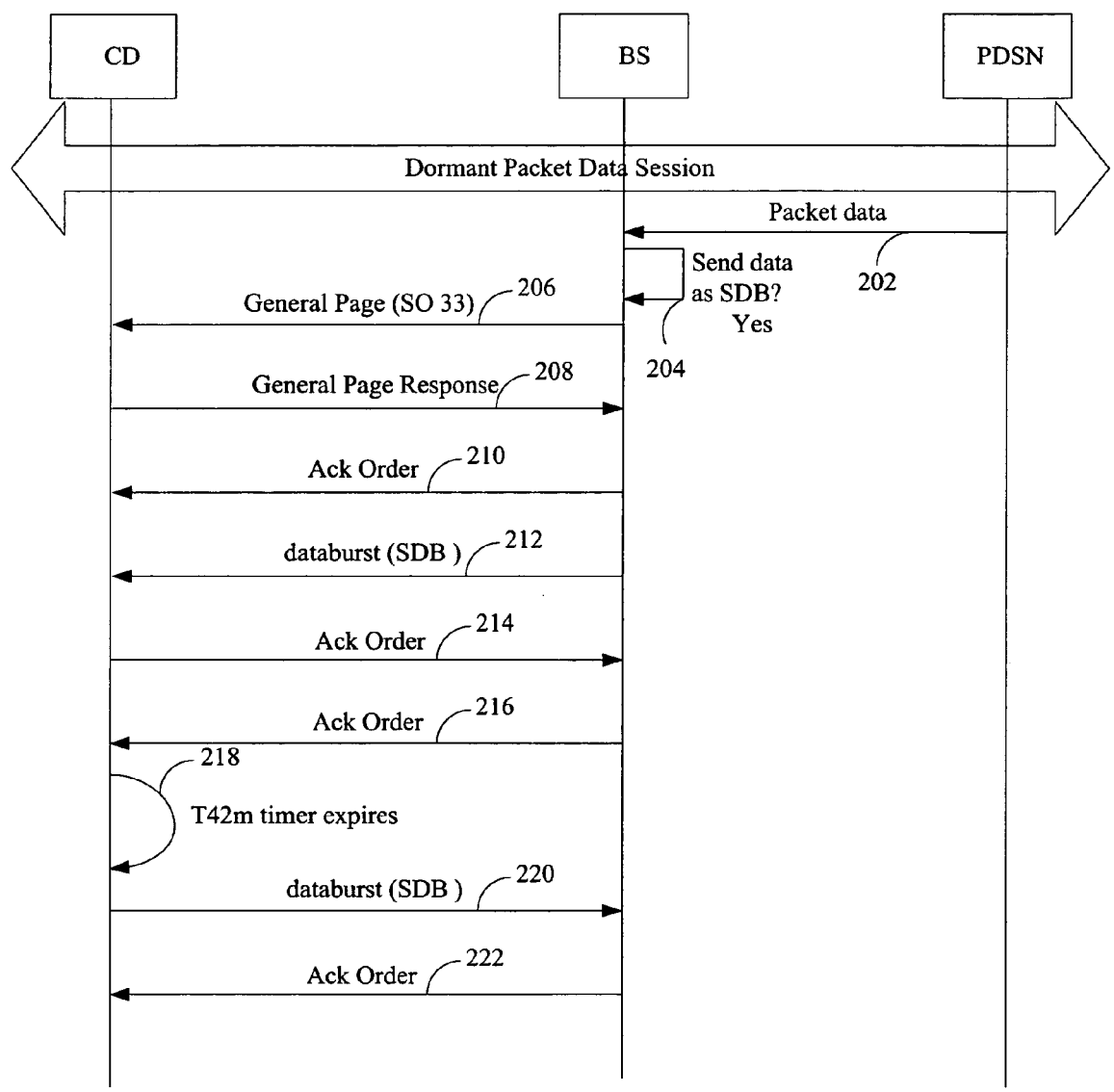
FIG. 2 through FIG. 9 illustrate call flows for exchanging information with a dormant communication device.

FIG. 2 shows a call-flow procedure for exchanging information with a dormant target CD, according to one embodiment. The packet data session is in the dormant state with PPP connected. The PDSN sends packet data 202 to the BSC/PCF on the existing PPP connection associated with the dormant target CD. The BSC/PCF determines, in step 204, whether the received packet data may be sent to the dormant target CD in short data bursts (SDB) form. In case the BSC/PCF determines that the received packet data may be sent to the dormant target CD in SDB form, BSC/PCF locates the dormant target CD. BSC/PCF locates the dormant target CD by sending a general page message 206 to the CD or using the location information already cached. The page message may be based on a service option (SO), such as "SO 33." After the BSC/PCF receives a page response 208, and sends an acknowledge message (ACK order) 210 to the dormant target CD, the BSC/PCF sends the received packet data to the dormant target CD in SDB form 212. The BSC/PCF indicates in message 212 to the dormant target CD whether the dormant target CD needs to send an Ack order upon receiving message 212. If an Ack order is required, and an Ack order 214 is received from the dormant target CD, BSC/PCF may also send an Ack order 216, acknowledging that BSC/PCF has received the Ack order 214 form the dormant target CD.

In one embodiment, after Ack order 216 is sent to the dormant target CD, BCS/PCF sets a timer 218, T42 timer, upon its expiration the dormant target CD may transition from access state to idle state and start forwarding information in a SDB message 220 to the BSC/BCF. If mobile-initiated message 220 requires an Ack order, BSC/PCF sends Ack order 222 to the dormant target CD.

Figure 3:
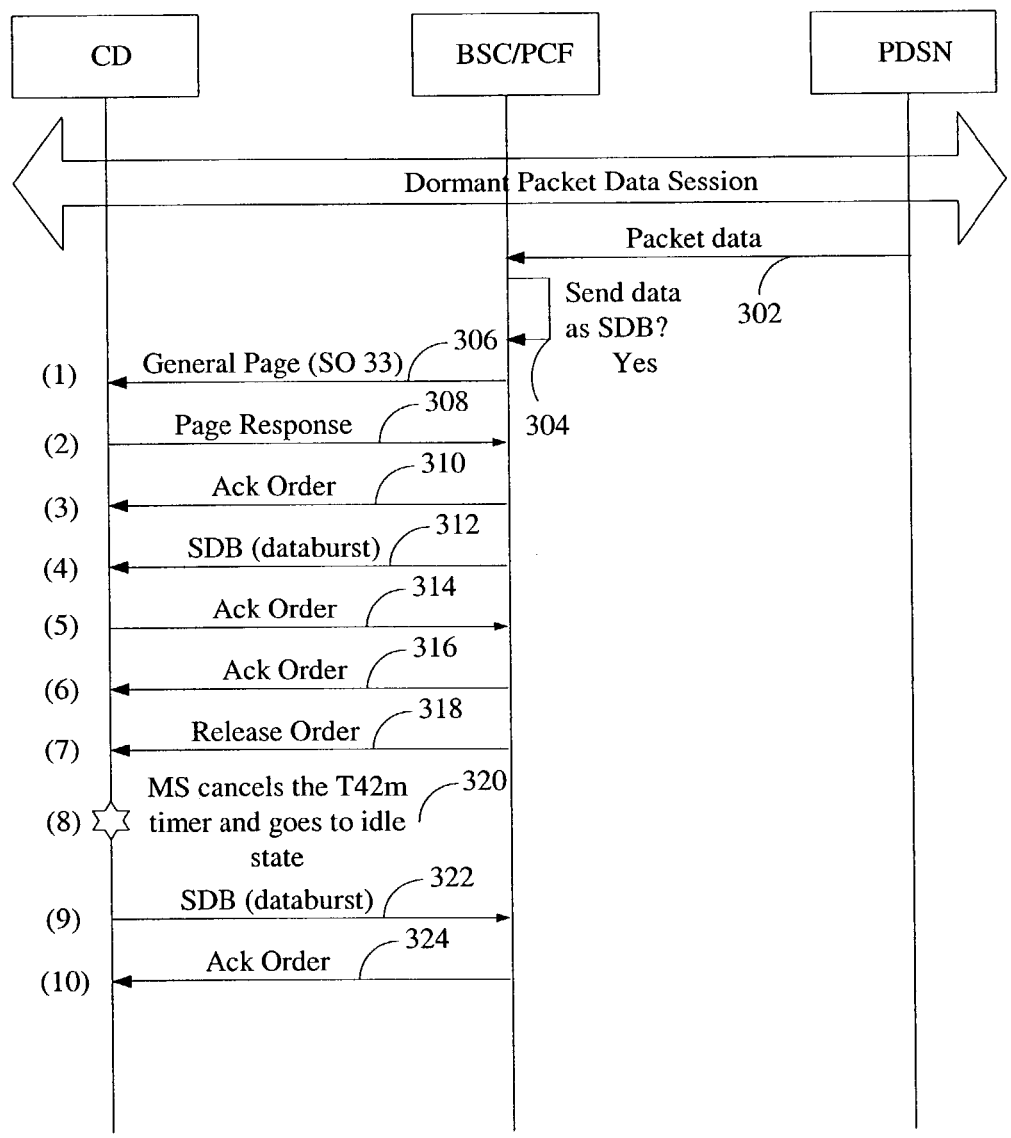

FIG. 3 shows a call-flow procedure for exchanging information with a dormant target CD, according to one embodiment. The packet data session is in the dormant state with PPP connected. The PDSN sends packet data 302 to the BSC/PCF on the existing PPP connection associated with the dormant target CD. The BSC/PCF determines, in step 304, whether the received packet data may be sent to the dormant target CD in short data bursts (SDB) form. In case the BSC/PCF determines that the received packet data may be sent to the dormant target CD in SDB form, BSC/PCF sends a general page message 306 to locate the dormant target CD. The page message may be based on a service option (SO), such as "SO 33." After the BSC/PCF receives a page response 308, and sends an acknowledge message (ACK order) 310 to the dormant target CD, the BSC/PCF sends the received packet data to the dormant target CD in SDB form 312. The BSC/PCF indicates in message 312 to the dormant target CD whether the dormant target CD needs to send an Ack order upon receiving message 312. If an Ack order is required, and Ack order 314 is received from the dormant target CD, BSC/PCF may also send Ack order 316, acknowledging that BSC/PCF has received Ack order 314 from the dormant target CD.

In one embodiment, after Ack order 316 is communicated with the dormant target CD, BSC/PCF sends "release order" 318 to the dormant target CD to allow the CD to cancel its timer. Upon receiving release order 318, the dormant target CD cancels the T42m timer 320 and transitions from access state into idle state, which allows the dormant target CD to send a SDB message 322 to the BSC/BCF. The dormant target CD may transition from the system access state into the idle state after going through system determination sub-state. However, the dormant target CD may transition from the system access state into the idle state without going through the system determination sub-state, to reduce time delay. If the mobile-initiated SDB message 322 requires an Ack order message, BSC/PCF sends Ack order 324 to the dormant target CD.

Figure 4:
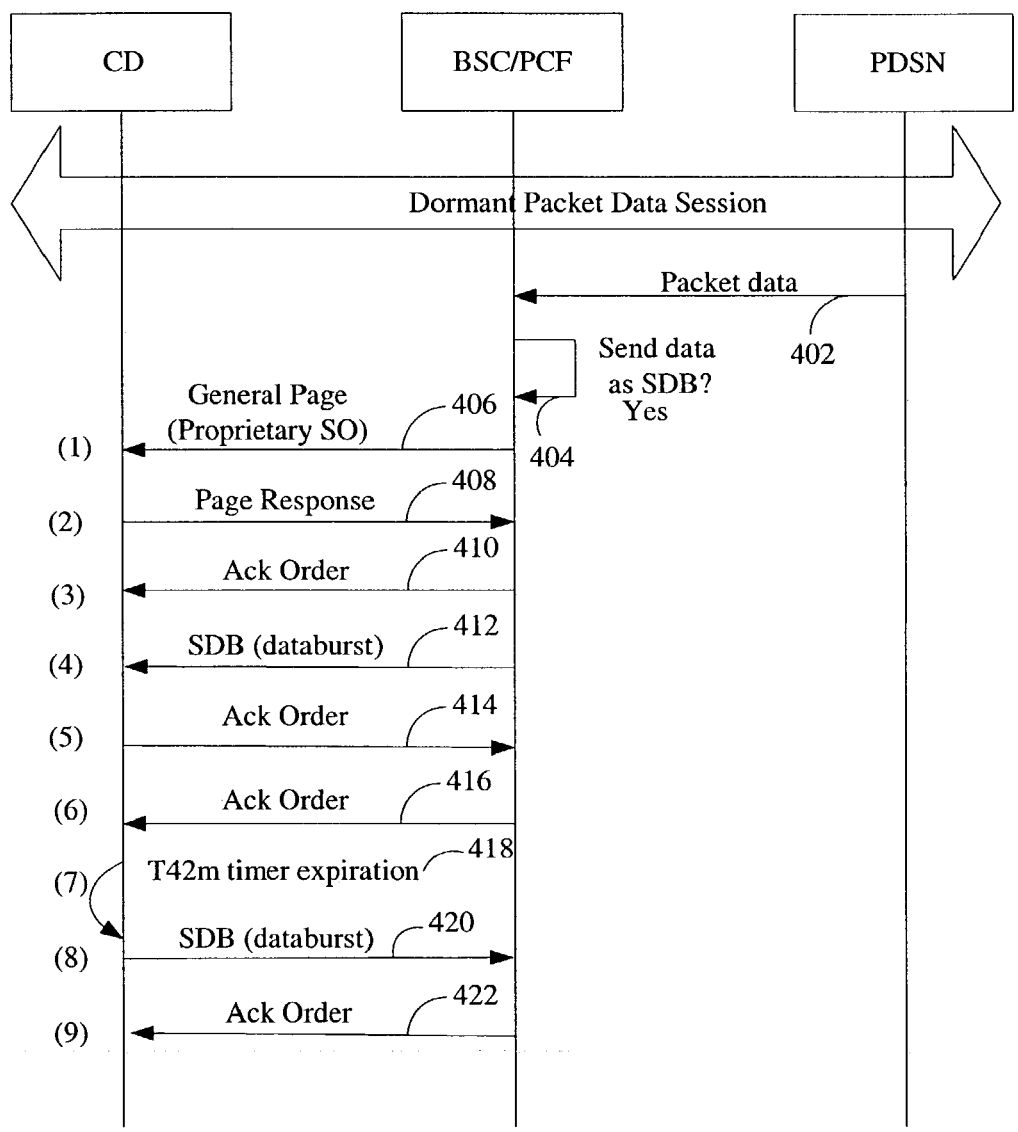

FIG. 4 shows a call-flow procedure for exchanging information with a dormant target CD, according to one embodiment. In this embodiment, the call flow procedure, illustrated by 402 through 422, is similar to the call flow procedure described in FIG. 2, but the page message 406 is based on an unused service option (SO), other than "SO 33," such as a proprietary SO, so that other BSC/PCF call processing that are designed based on "SO 33" need not be modified for SDB delivery.

Figure 5:
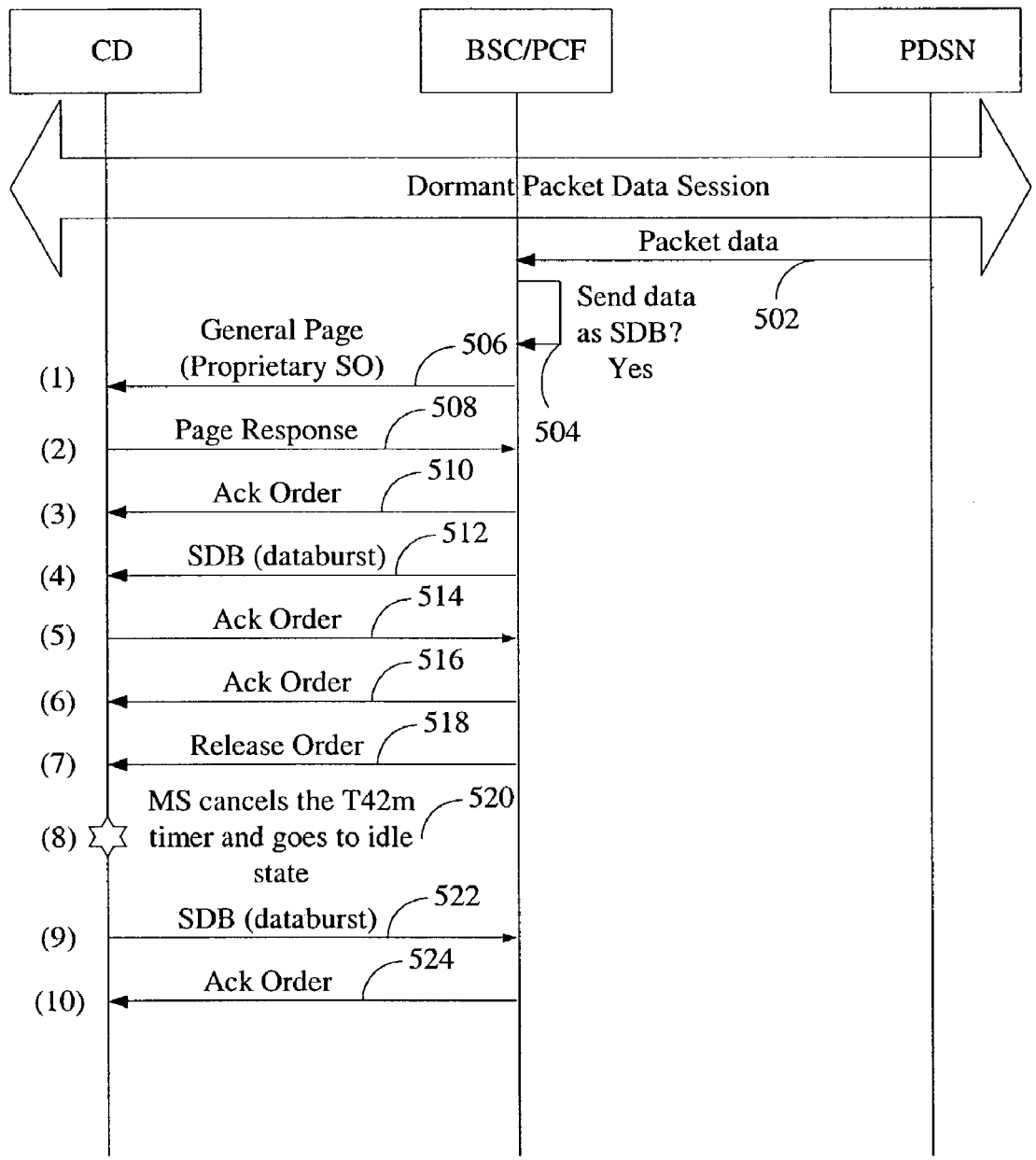

FIG. 5 shows a call-flow procedure for exchanging information with a dormant target CD, according to one embodiment. In this embodiment, the call flow procedure, illustrated by 502 through 524, is similar to the call flow procedure described in FIG. 3, but page message 506 based on an unused service option (SO), other than "SO 33," such as a proprietary SO, so that other BSC/PCF call processing that are designed based on "SO 33" need not be modified for SDB delivery.

Figure 6:
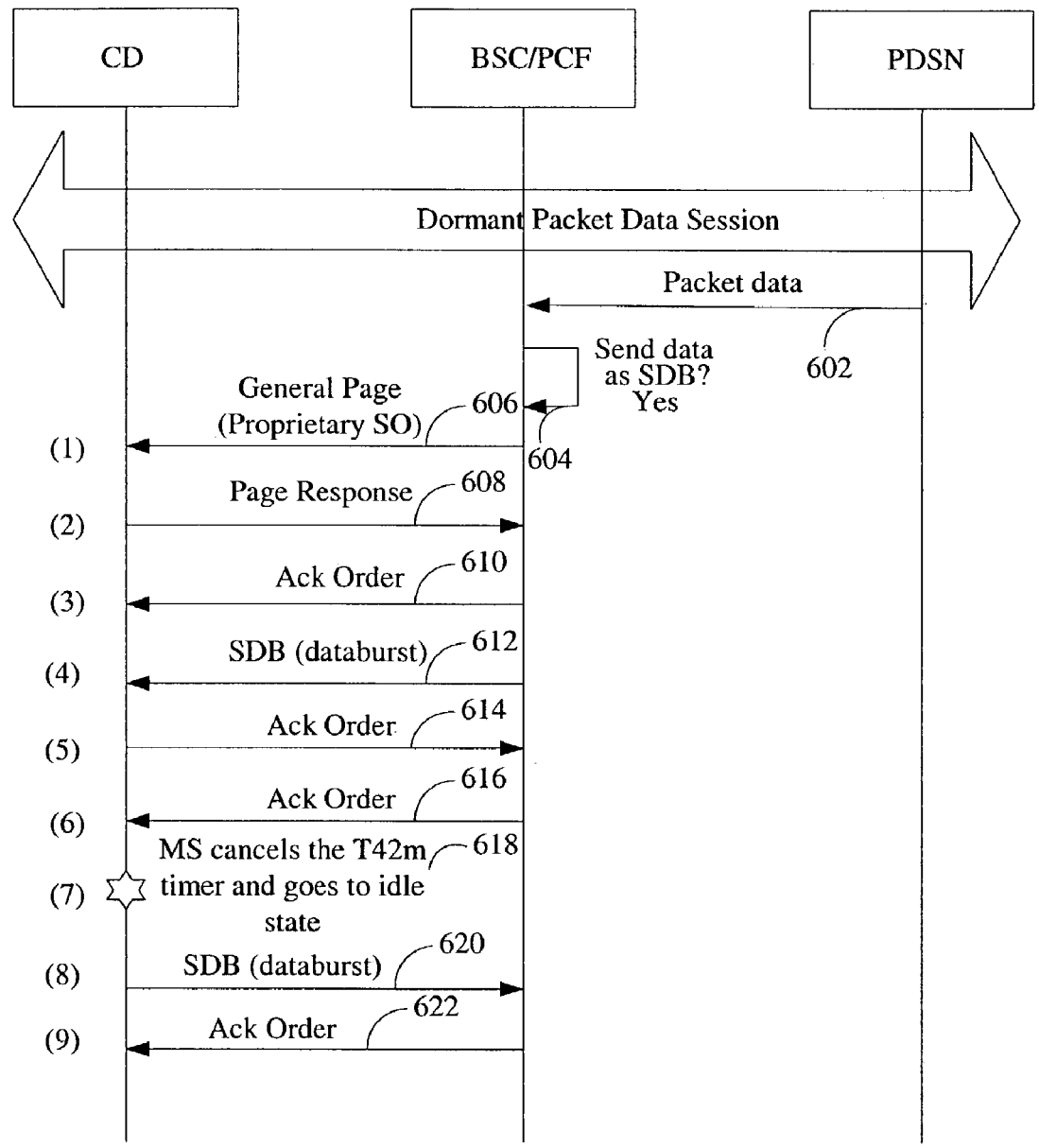

FIG. 6 shows a call-flow procedure for exchanging information with a dormant target CD, according to one embodiment. The packet data session is in the dormant state with PPP connected. The PDSN sends packet data 602 to the BSC/PCF on the existing PPP connection associated with the dormant target CD. The BSC/PCF determines whether the received packet data may be sent to the dormant target CD in short data bursts (SDB) form. In case the BSC/PCF determines that the received packet data may be sent to the dormant target CD in SDB form, BSC/PCF sends a general page message 606 to locate the dormant target CD. The page message may be based on a proprietary service option (SO), such as "SO 0x 8026."

The BSC/PCF uses the proprietary SO to page the dormant target CD to indicate to the dormant target CD that there is a SDB message that needs to be delivered to the dormant target CD. Using the proprietary SO allows the dormant target CD to independently transition into idle state, without having the BSC/PCF to send a release order. The messages 606 through 616 are similar to those shown in FIG. 3, with all implementation variations. Upon receiving Ack order 616 at the dormant target CD, the dormant target CD cancels the T42m timer 618 and transitions from access state into idle state, which allows the dormant target CD to send a SDB message 620 to the BSC/BCF. The dormant target CD may transition from the system access state into the idle state after going through system determination sub-state. However, the dormant target CD may transition from the system access state into the idle state without going through the system determination sub-state, to reduce time delay. If the mobile-initiated SDB message 620 requires an Ack order message, BSC/PCF sends Ack order 622 to the dormant target CD.

Figure 7:
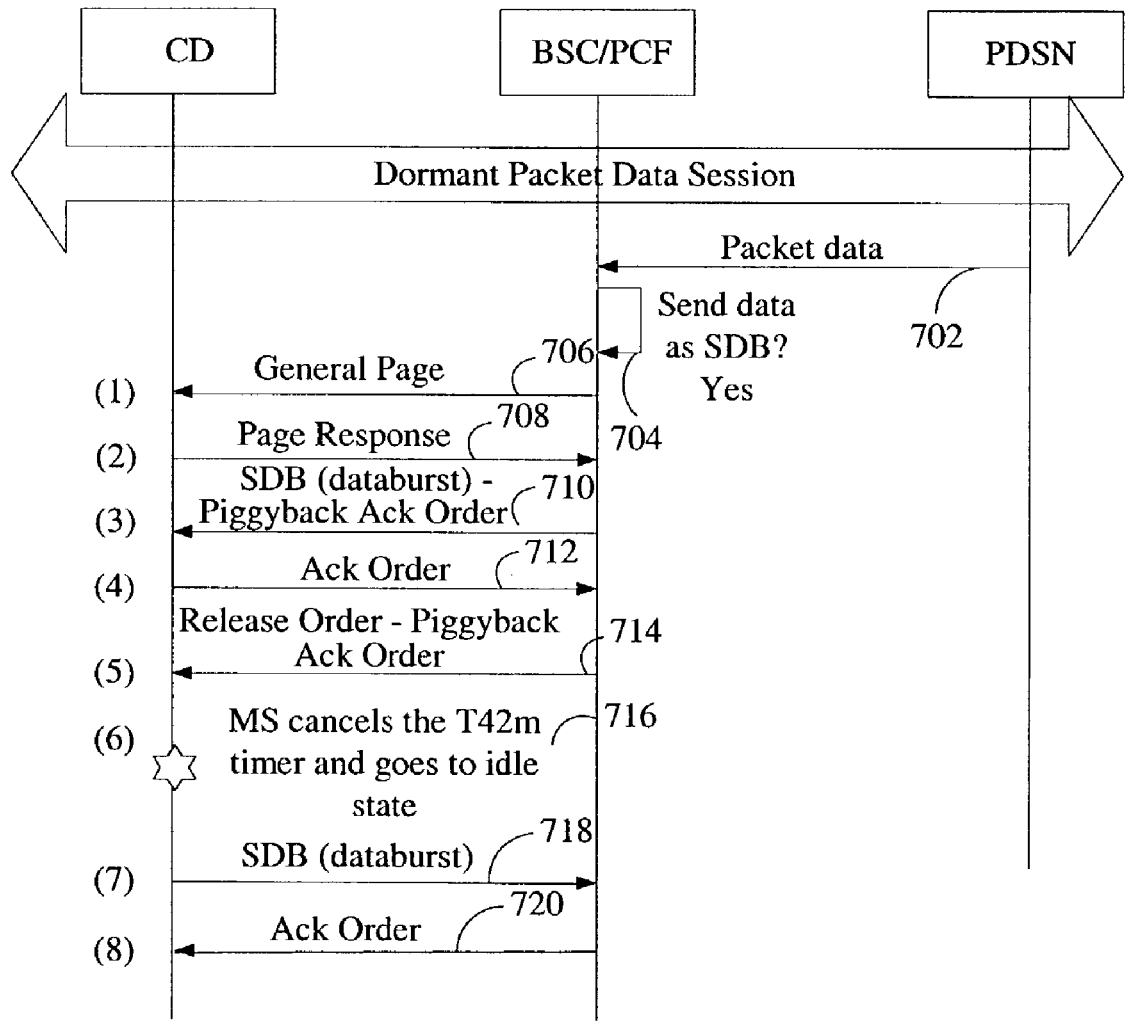

FIG. 7 shows a call-flow procedure for exchanging information with a dormant target CD, according to one embodiment. In this embodiment, call flow steps illustrated by 702 through 708 are similar to call flow steps 502 through 508 described in connection with FIG. 5. However, in step 710, BSC/PCF piggybacks Ack Order 510 for page response 508 onto the SDB message 512 that BSC/PCF sends to the dormant target CD. This eliminates the need to send the Ack Order as a separate signaling message, thus further reducing time delay. If the mobile-terminated SDB message is acknowledge required message, dormant target CD sends Ack order 712 to the BSC/PCF to indicate that it has successfully received the SDB message. To take further advantage of the piggybacking, Ack Order 516 is piggybacked onto the release order 518, in step 714. Steps 716 through 720 are similar to steps 520 through 524 discussed in connection with FIG. 5.

Figure 8:
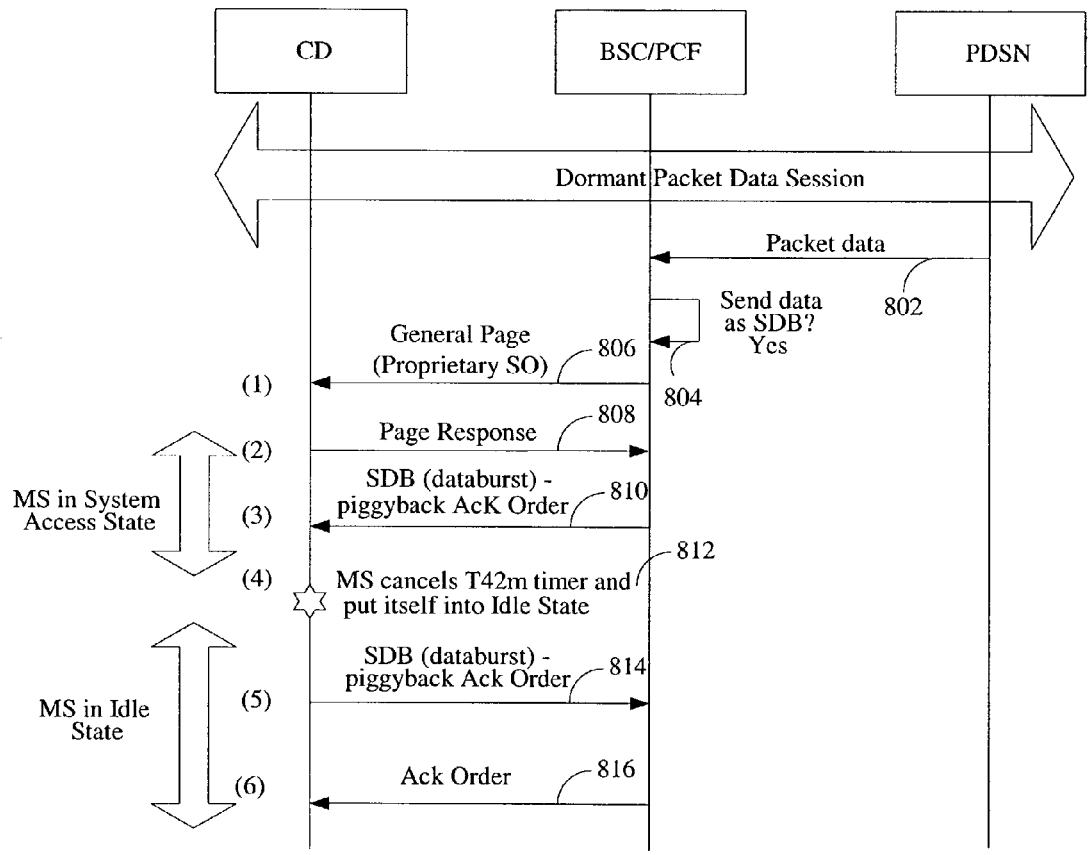

FIG. 8 shows a call-flow procedure for exchanging information with a dormant target CD, according to one embodiment. In this embodiment, call flow steps illustrated by 802 through 808 are similar to call flow steps 602 through 608 described in connection with FIG. 6. However, in step 810, BSC/PCF piggybacks Ack Order 610 for page response 608 onto the SDB message 612 that BSC/PCF sends to the dormant target CD. This eliminates the need to send the Ack Order as a separate signaling message, thus further reducing time delay. Upon reception of the SDB from the BSC/PCF in step 810, dormant target CD cancels its timer, in step 812, and puts itself into idle state. If the mobile-terminated SDB message is acknowledge required message, dormant target CD sends acknowledgment to the BSC/PCF to indicate that it has successfully received the SDB message. To take advantage of the piggybacking also on the reverse link, dormant target CD may wait for some predetermined period of time to see if there is any mobile-originated SDB to send to BSC/PCF. If the dormant target CD determines within the predetermined time period that there is a SDB message to be sent, Ack Order 614 for the SDB message 612 is piggybacked onto the SDB message 620, in step 814. Otherwise, Ack Order 614 is sent separately. If the mobile-initiated SDB message sent in step 814 requires an Ack order message, BSC/PCF sends Ack order 816 to the dormant target CD.

Figure 9:
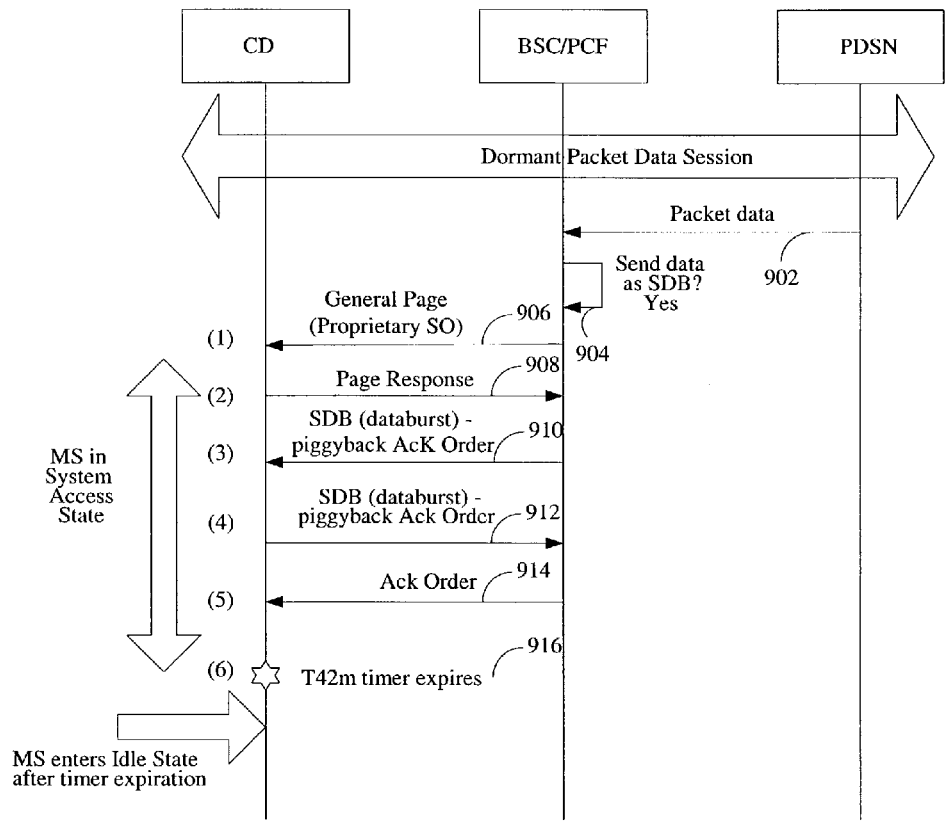

FIG. 9 shows a call-flow procedure for exchanging information with a dormant target CD, according to one embodiment. In this embodiment, call flow steps illustrated by 902 through 910 are similar to the call flow steps 802 through 810 described in connection with FIG. 8. However, step 812 is postponed and the dormant target CD transmits the SDB message upon receiving the SDB message, while the dormant target CD is in the system access state. In step 912, dormant target CD piggybacks Ack Order for SDB message received from the BSC/PCF onto the SDB message that needs to be sent to BSC/PCF. In this approach, the dormant target CD is not required to cancel its timer and put itself into idle state, thus further reducing time delay. If the mobile-initiated SDB message sent in step 912 requires an Ack order message, BSC/PCF sends Ack order 914 to the dormant target CD. The dormant target CD transitions into idle state after its timer expires 916 or other events that cause the CD to transit to the idle state occur.

Figure 10:
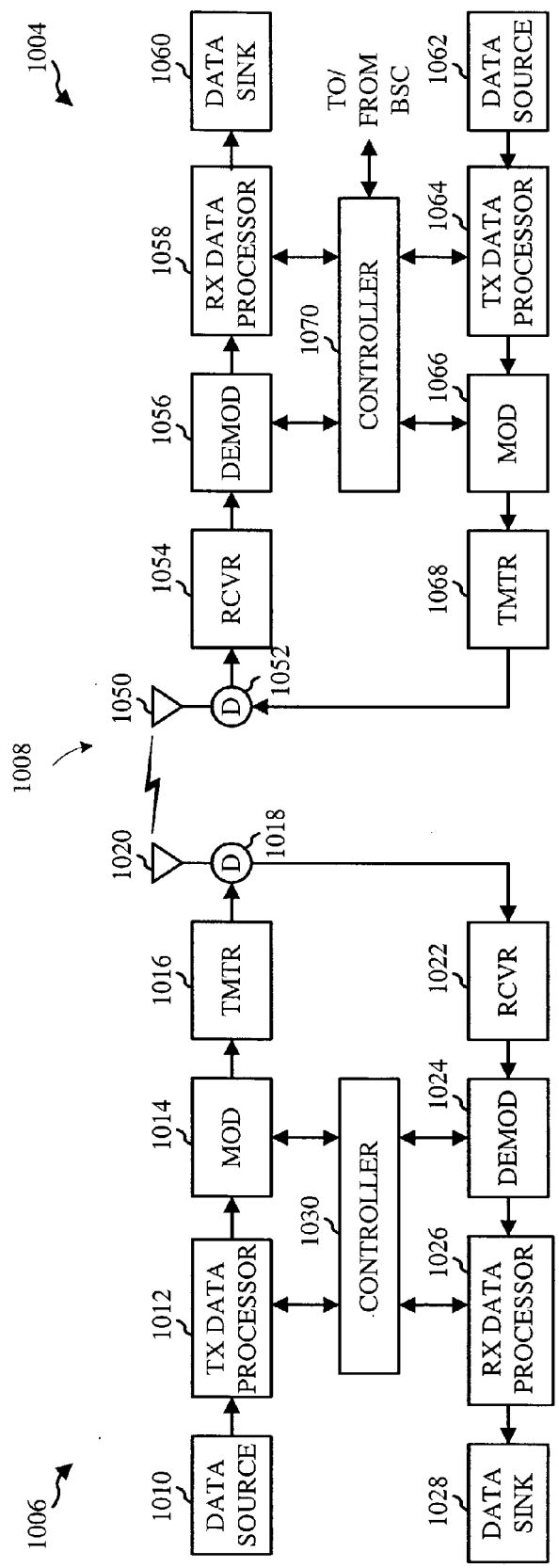
FIG. 10 illustrates one embodiment for a communication device and a base station.

FIG. 10 is a simplified block diagram of an embodiment of a BSC/PCF 1004 and a communication device 1006, which are capable of implementing various disclosed embodiments. For a particular communication, voice, data, packet data, and/or alert messages may be exchanged between BSC/PCF 1004 and communication device 1006, via an air interface 1008. Various types of messages may be transmitted, such as messages used to establish a communication session between the base station and the communication device, registration and paging messages, and messages used to control a data transmission (e.g., power control, data rate information, acknowledgment, and so on). Some of these message types are described in further detail below.

For the reverse link, at communication device 1006, voice and/or packet data (e.g., from a data source 1010) and messages (e.g., from a controller 1030) are provided to a transmit (TX) data processor 1012, which formats and encodes the data and messages with one or more coding schemes to generate coded data. Each coding scheme may include any combination of cyclic redundancy check (CRC), convolutional, turbo, block, and other coding, or no coding at all. The voice, packet data, and messages may be coded using different schemes, and different types of messages may be coded differently.

The coded data is then provided to a modulator (MOD) 1014 and further processed (e.g., covered, spread with short PN sequences, and scrambled with a long PN sequence assigned to the user terminal). The modulated data is then provided to a transmitter unit (TMTR) 1016 and conditioned (e.g., converted to one or more analog signals, amplified, filtered, and quadrature modulated) to generate a reverse link signal. The reverse link signal is routed through a duplexer (D) 1018 and transmitted via an antenna 1020 to BSC/PCF 1004.

At BSC/PCF 1004, the reverse link signal is received by an antenna 1050, routed through a duplexer 1052, and provided to a receiver unit (RCVR) 1054. Alternatively, the antenna may be part of the wireless operator network, and the connection between the antenna and the BS/BSC may be routed through the Internet. BSC/PCF 1004 may receive media information and alert messages from remote access device 1006. Receiver unit 1054 conditions (e.g., filters, amplifies, down converts, and digitizes) the received signal and provides samples. A demodulator (DEMOD) 1056 receives and processes (e.g., despreads, decovers, and pilot demodulates) the samples to provide recovered symbols. Demodulator 1056 may implement a rake receiver that processes multiple instances of the received signal and generates combined symbols. A receive (RX) data processor 1058 then decodes the symbols to recover the data and messages transmitted on the reverse link. The recovered voice/packet data is provided to a data sink 1060 and the recovered messages may be provided to a controller 1070. Controller 1070 may include instructions for receiving and sending information, receiving and sending Ack order messages, receiving and sending responses to Ack order messages, sending information, sending paging messages and receiving responses thereto, and interpreting and sending service option numbers. The processing by demodulator 1056 and RX data processor 1058 are complementary to that performed at remote access device 1006. Demodulator 1056 and RX data processor 1058 may further be operated to process multiple transmissions received via multiple channels, e.g., a reverse fundamental channel (R-FCH) and a reverse supplemental channel (R-SCH). Also, transmissions may be simultaneously from multiple mobile stations, each of which may be transmitting on a reverse fundamental channel, a reverse supplemental channel, or both.

On the forward link, at BSC/PCF 1004, voice and/or packet data (e.g., from a data source 1062) and messages (e.g., from controller 1070) are processed (e.g., formatted and encoded) by a transmit (TX) data processor 1064, further processed (e.g., covered and spread) by a modulator (MOD) 1066, and conditioned (e.g., converted to analog signals, amplified, filtered, and quadrature modulated) by a transmitter unit (TMTR) 1068 to generate a forward link signal. The forward link signal is routed through duplexer 1052 and transmitted via antenna 1050 to remote access device 1006. Forward link signals include paging signals.

At communication device 1006, the forward link signal is received by antenna 1020, routed through duplexer 1018, and provided to a receiver unit 1022. Receiver unit 1022 conditions (e.g., down converts, filters, amplifies, quadrature modulates, and digitizes) the received signal and provides samples. The samples are processed (e.g., despreaded, decovered, and pilot demodulated) by a demodulator 1024 to provide symbols, and the symbols are further processed (e.g., decoded and checked) by a receive data processor 1026 to recover the data and messages transmitted on the forward link. The recovered data is provided to a data sink 1028, and the recovered messages may be provided to controller 1030. Controller 1030 may include instructions for receiving and sending information, receiving and sending Ack order messages, receiving and sending responses to Ack order messages, sending information, receiving paging messages and sending responses thereto, transitioning to and from idle state, and receiving and interpreting service option numbers. Therefore, the disclosed embodiments provide for a significant reduction in the exchanging information with target CDs that are dormant and have no active traffic channel.

The disclosed methods and apparatuses provide for an efficient mechanism for exchanging information with dormant target CDs, using service option numbers that signify that information is being communicated in short data burst (SDB) form.

Those of skill in the art would understand that information and signals may be represented using any of a variety of different technologies and protocols. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

The invention claimed is:

1. A method for exchanging information with a dormant target communication device in a wireless communication system, the method comprising:
sending a page message to a dormant target communication device to locate the dormant target communication device by a wireless infrastructure;
receiving a page response from the dormant target communication device;
forwarding information to the dormant target communication device by the wireless infrastructure, wherein the information is piggybacked onto a message acknowledging the receipt of the page response; and
forwarding a release order to the dormant target communication device, the release order operable to cancel a timer on the dormant target communication device and thereby allowing the dormant target communication device to start forwarding information in a short data burst format to the wireless infrastructure.

2. The method of claim 1, wherein the page message includes a service option.

3. The method of claim 1, wherein said forwarding information to the dormant target communication device further comprises forwarding the information on a common channel of a wireless network.

4. The method of claim 1, wherein said forwarding information to the dormant target communication device further comprises forwarding the information as short data bursts.

5. The method of claim 1, wherein the release order is operable to cause the dormant target communications device to change from a system access state to an idle state.

6. The method of claim 1, further comprising receiving a short data burst format message from the dormant target communication device initiated by the release order.

7. The method of claim 6, wherein the short data burst format message is generated during a system access state of the dormant target communication device.

8. A method for exchanging information with a dormant target communication device in a wireless communication system, the method comprising:
sending a page message to a dormant target communication device to locate the dormant target communication device by a wireless infrastructure, the pane message having a predetermined component operable to cancel a timer on the dormant target communication device thereby allowing the dormant target communication device to start forwarding information in a short data burst format to the wireless infrastructure;
receiving a page response from the dormant target communication device;
forwarding information to the dormant target communication device by the wireless infrastructure, wherein the information is piggybacked onto a message acknowledging the receipt of the page response; and
receiving information from the dormant target communication device in the short data burst format based on the page message.

9. The method of claim 8, wherein the predetermined component comprises a service option associated with a short data burst format.

10. The method of claim 8, wherein said forwarding information to the dormant target communication device further comprises forwarding the information on a common channel of a wireless network.

11. The method of claim 8, wherein said forwarding information to the dormant target communication device further comprises forwarding the information as short data bursts.

12. The method of claim 8, wherein the page message is operable to cause the dormant target communications device to change from a system access state to an idle state.

13. The method of claim 8, wherein receiving information from the dormant target communication device in the short data burst format further comprises receiving a short data burst format message piggybacked with a message acknowledging receipt by the dormant communication device of the information forwarded by the wireless infrastructure.

14. The method of claim 8, wherein the information received from the dormant target communication device in the short data burst format is generated during a system access state of the dormant target communication device.

15. A computer-readable medium storing program codes for performing a method for exchanging information with a dormant target communication device in a wireless communication system, the method comprising:
sending a page message to a dormant target communication device to locate the dormant target communication device by a wireless infrastructure;
receiving a page response from the dormant target communication device;
forwarding information to the dormant target communication device by the wireless infrastructure, wherein the information is piggybacked onto a message acknowledging the receipt of the page response; and
forwarding a release order to the dormant target communication device, the release order operable to cancel a timer on the dormant target communication device and thereby allowing the dormant target communication device to start forwarding information in a short data burst format to the wireless infrastructure.

16. A computer-readable medium storing program codes for performing a method for exchanging information with a dormant target communication device in a wireless communication system, the method comprising:
sending a page message to a dormant target communication device to locate the dormant target communication device by a wireless infrastructure, the page message having a predetermined component operable to cancel a timer on the dormant target communication device thereby allowing the dormant target communication device to start forwarding information in a short data burst format to the wireless infrastructure;
receiving a page response from the dormant target communication device;
forwarding information to the dormant target communication device by the wireless infrastructure, wherein the information is piggybacked onto a message acknowledging the receipt of the page response; and
receiving information from the dormant target communication device in the short data burst format based on the page message.

17. An apparatus for exchanging information with a dormant target communication device in a wireless communication system, comprising:
means for sending a page message to a dormant target communication device to locate the dormant target communication device by a wireless infrastructure;
means for receiving a page response from the dormant target communication device;

means for forwarding information to the dormant target communication device by the wireless infrastructure, wherein the information is piggybacked onto a message acknowledging the receipt of the page response; and means for forwarding a release order to the dormant target communication device, the release order operable to cancel a timer on the dormant target communication device and thereby allowing the dormant target communication device to start forwarding information to the wireless infrastructure in a short data burst format.

18. An apparatus for exchanging information with a dormant target communication device in a wireless communication system, comprising:
    means for sending a page message to a dormant target communication device to locate the dormant target communication device by a wireless infrastructure, the page message having a predetermined component operable to cancel a timer on the dormant target communication device thereby allowing the dormant target communication device to start forwarding information in a short data burst format to the wireless infrastructure;
    means for receiving a page response from the dormant target communication device;
    means for forwarding information to the dormant target communication device by the wireless infrastructure, wherein the information is piggybacked onto a message acknowledging the receipt of the page response; and
    means for receiving information from the dormant target communication device in the short data burst format based on the page message.

19. An apparatus for exchanging information with a dormant target communication device in a wireless communication system, comprising:
    a memory unit;
    a receiver;
    a transmitter; and
    a processor coupled to the memory unit, the receiver, and the transmitter, the processor being capable of:
        sending a page message to a dormant target communication device to locate the dormant target communication device by a wireless infrastructure;
        receiving a page response from the dormant target communication device;
        forwarding information to the dormant target communication device by the wireless infrastructure, wherein the information is piggybacked onto a message acknowledging the receipt of the page response; and
        forwarding a release order to the dormant target communication device, the release order operable to cancel a timer on the dormant target communication device and thereby allowing the dormant target communication device to start forwarding information to the wireless infrastructure in a short data burst format.

20. The apparatus of claim 19, wherein the release order is operable to cause the dormant target communications device to change from a system access state to an idle state.

21. The apparatus of claim 19, wherein the processor is further capable of receiving a short data burst format message from the dormant target communication device initiated by the release order.

22. The apparatus of claim 21, wherein the short data burst format message is generated during a system access state of the dormant target communication device.

23. An apparatus for exchanging information with a dormant target communication device in a wireless communication system, comprising:
    a memory unit;
    a receiver;
    a transmitter; and
    a processor coupled to the memory unit, the receiver, and the transmitter, the processor being capable of:
        sending a page message to a dormant target communication device to locate the dormant target communication device by a wireless infrastructure, the page message having a predetermined component operable to cancel a timer on the dormant target communication device thereby allowing the dormant target communication device to start forwarding information in a short data burst format to the wireless infrastructure;
        receiving a page response from the dormant target communication device;
        forwarding information to the dormant target communication device by the wireless infrastructure, wherein the information is piggybacked onto a message acknowledging the receipt of the page response; and
        receiving information from the dormant target communication device in the short data burst format based on the page message.

24. The method of claim 23, wherein the predetermined component comprises a predetermined service option value.

25. The method of claim 23, wherein the page message is operable to cause the dormant target communications device to change from a system access state to an idle state.

26. The apparatus of claim 23, wherein receiving information from the dormant target communication device in the short data burst format further comprises receiving a short data burst format message piggybacked with a message acknowledging receipt by the dormant communication device of the information forwarded by the wireless infrastructure.

27. The apparatus of claim 23, wherein the information received from the dormant target communication device in the short data burst format is generated during a system access state of the dormant target communication device.

28. A method for exchanging information with a dormant target communication device in a wireless communication system, the method comprising:
    sending a page message to a dormant target communication device to locate the dormant target communication device by a wireless infrastructure;
    receiving a page response from the dormant target communication device;
    forwarding information to the dormant target communication device by the wireless infrastructure;
    receiving an acknowledgement message that the dormant target communication has received the information; and
    forwarding a release order to the dormant target communication device, the release order operable to cancel a timer on the dormant target communication device and thereby allowing the dormant target communication device to start forwarding information in a short data burst format to the wireless infrastructure, wherein the release order is piggybacked with a message acknowledging the receipt of the acknowledgement message.

29. The method of claim 28, wherein forwarding information to the dormant target communication device further comprises piggybacking the information with a message acknowledging the receipt of the page response.

30. The method of claim 28, wherein the release order is operable to cause the dormant target communications device to change from a system access state to an idle state.

31. The method of claim 28, further comprising receiving a short data burst format message from the dormant target communication device initiated by the release order.

32. The method of claim 31, wherein the short data burst format message is generated during a system access state of the dormant target communication device.

33. A method for exchanging information with a dormant target communication device in a wireless communication system, the method comprising:
- sending a page message to a dormant target communication device to locate the dormant target communication device by a wireless infrastructure, the page message having a predetermined component operable to cancel a timer on the dormant target communication device thereby allowing the dormant target communication device to start forwarding information in a short data burst format to the wireless infrastructure;
- receiving a page response from the dormant target communication device;
- forwarding information to the dormant target communication device by the wireless infrastructure; and
- receiving information from the dormant target communication device in the short data burst format based on the page message, wherein the information is piggybacked with a message acknowledging the receipt of the information sent by the wireless structure.

34. The method of claim 33, wherein the predetermined component comprises a predetermined service option value.

35. The method of claim 33, wherein the page message is operable to cause the dormant target communications device to change from a system access state to an idle state.

36. The method of claim 35, wherein the information received from the dormant target communication device in the short data burst format is generated during a system access state of the dormant target communication device.

37. An apparatus for exchanging information with a dormant target communication device in a wireless communication system, comprising:
- a memory unit;
- a receiver;
- a transmitter; and
- a processor coupled to the memory unit, the receiver, and the transmitter, the processor being capable of:
  - sending a page message to a dormant target communication device to locate the dormant target communication device by a wireless infrastructure;
  - receiving a page response from the dormant target communication device;
  - forwarding information to the dormant target communication device by the wireless infrastructure;
  - receiving an acknowledgement message that the dormant target communication has received the information; and
  - forwarding a release order to the dormant target communication device, the release order operable to cancel a timer on the dormant target communication device and thereby allowing the dormant target communication device to start forwarding information to the wireless infrastructure in a short data burst format, wherein the release order is piggybacked with a message acknowledging the receipt of the acknowledgement message.

38. The apparatus of claim 37, wherein forwarding information to the dormant target communication device further comprises piggybacking the information with a message acknowledging the receipt of the page response.

39. The apparatus of claim 37, wherein the release order is operable to cause the dormant target communications device to change from a system access state to an idle state.

40. The apparatus of claim 37, further comprising receiving a short data burst format message from the dormant target communication device initiated by the release order.

41. The apparatus of claim 40, wherein the short data burst format message is generated during a system access state of the dormant target communication device.

42. An apparatus for exchanging information with a dormant target communication device in a wireless communication system, comprising:
- a memory unit;
- a receiver;
- a transmitter; and
- a processor coupled to the memory unit, the receiver, and the transmitter, the processor being capable of:
  - sending a page message to a dormant target communication device to locate the dormant target communication device by a wireless infrastructure, the page message having a predetermined component operable to cancel a timer on the dormant target communication device thereby allowing the dormant target communication device to start forwarding information in a short data burst format to the wireless infrastructure;
  - receiving a page response from the dormant target communication device;
  - forwarding information to the dormant target communication device by the wireless infrastructure; and
  - receiving information from the dormant target communication device in the short data burst format based on the page message, wherein the information is piggybacked with a message acknowledging the receipt of the information sent by the wireless structure.

43. The apparatus of claim 42, wherein the predetermined component comprises a predetermined service option value.

44. The apparatus of claim 43, wherein the page message is operable to cause the dormant target communications device to change from a system access state to an idle state.

45. The apparatus of claim 43, wherein the information received from the dormant target communication device in the short data burst format is generated during a system access state of the dormant target communication device.

* * * * *